(12) United States Patent
Lo (10) Patent No.: US 11,914,164 B2
(45) Date of Patent: Feb. 27, 2024

(54) OPTICAL ENGINE MODULE AND PROJECTION DEVICE

(71) Applicant: Coretronic Corporation, Hsin-Chu (TW)

(72) Inventor: Yi-Chien Lo, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/692,169

(22) Filed: Mar. 11, 2022

(65) Prior Publication Data

US 2022/0299785 A1    Sep. 22, 2022

(30) Foreign Application Priority Data

Mar. 18, 2021    (CN) .......................... 202110288903.4

(51) Int. Cl.
*G02B 27/14*     (2006.01)
*G02B 5/02*      (2006.01)
(Continued)

(52) U.S. Cl.
CPC ......... *G02B 27/141* (2013.01); *G02B 5/0284* (2013.01); *G02B 27/0172* (2013.01); *G02B 27/18* (2013.01); *G02B 27/285* (2013.01)

(58) Field of Classification Search
None
See application file for complete search history.

(56) References Cited

U.S. PATENT DOCUMENTS

2009/0213333 A1    8/2009  Chen
2019/0271842 A1*   9/2019  Fujita ................. G02B 27/0101
(Continued)

FOREIGN PATENT DOCUMENTS

CN      111694208      9/2020
TW      I639795        11/2018
(Continued)

OTHER PUBLICATIONS

"Search Report of Europe Counterpart Application", dated Jul. 27, 2022, p. 1-p. 8.
(Continued)

*Primary Examiner* — Bao-Luan Q Le
*Assistant Examiner* — Danell L Owens
(74) *Attorney, Agent, or Firm* — JCIPRNET (57) ABSTRACT

An optical engine module and a projection device are provided. The optical engine module includes a light source unit, a first diffusion element, a polarizing beam splitting element, a second diffusion element, and a light valve. The light source unit emits a light beam. The first diffusion element is disposed on a transmission path of the light beam. The polarizing beam splitting element is disposed on the transmission path of the light beam. The first diffusion element is disposed between the polarizing beam splitting element and the light source unit. The second diffusion element has at least one optical surface to reflect and diffuse the light beam. The light beam forms an illumination beam after passing through the second diffusion element, and the illumination beam has an optical image matching angle. The light valve is disposed on a transmission path of the illumination beam. The light valve converts the illumination beam to an image beam.

9 Claims, 4 Drawing Sheets

(51) Int. Cl.
*G02B 27/01* (2006.01)
*G02B 27/18* (2006.01)
*G02B 27/28* (2006.01)

(56) References Cited

U.S. PATENT DOCUMENTS

2020/0033622 A1* 1/2020 Wei .................... G02B 17/0856
2020/0292835 A1* 9/2020 Lo ........................ G03B 21/008

FOREIGN PATENT DOCUMENTS

| TW | 202034059 | 9/2020 | |
|---|---|---|---|
| WO | 2014093085 | 6/2014 | |
| WO | WO-2014093085 A1 * | 6/2014 | ......... G02B 27/0961 |

OTHER PUBLICATIONS

"Office Action of China Counterpart Application", dated Nov. 14, 2023, p. 1-p. 8.

* cited by examiner

OPTICAL ENGINE MODULE AND PROJECTION DEVICE

CROSS-REFERENCE TO RELATED APPLICATION

This application claims the priority benefit of China application serial no. 202110288903.4, filed on Mar. 18, 2021. The entirety of the above-mentioned patent application is hereby incorporated by reference herein and made a part of this specification.

BACKGROUND

Technical Field

This disclosure relates to an optical module and an optical device, and in particular to an optical engine module and a projection device.

Description of Related Art

With the advancement of display technology and demand for high technology by consumers, near-eye display (NED) and head-mounted display (HMD) are products with great development potential currently. Applications related to near-eye display technology can be divided into augmented reality (AR) technology and virtual reality (VR) technology currently. As a light field near-eye display (LFNED) has immediate light field information, it can achieve an effect of focusing afterwards, thereby providing image information that has a depth, which can be used in the augmented reality technology and the virtual reality technology of the near-eye display technology.

In general, optical elements such as a polarizing beam splitting element, a micro lens array, and a focusing lens are used in an optical design of an optical engine module of the near-eye display technology, to enable an image beam entering an imaging system to conform to a pupil of the imaging system. However, as spectroscopic characteristics of the polarizing beam splitting element cause beams of different wavebands with a large incident angle to have different penetration rates, therefore, a color shift is likely to occur for the light beams with a large incident angle. Therefore, a decrease in light collection efficiency of the polarizing beam splitting element incident at a large angle or uneven off-axis color may occur when the imaging system requires a field of view above a certain angle, thereby affecting the image quality.

The information disclosed in this background section is only for enhancement of understanding of the background of the described technology and therefore it may contain information that does not form the prior art that is already known to a person of ordinary skill in the art. Furthermore, the information disclosed in the background section does not mean that one or more problems to be resolved by one or more embodiments of the disclosure were acknowledged by a person of ordinary skill in the art.

SUMMARY

This disclosure provides an optical engine module with good image quality and resolution.

The disclosure provides a projection device with good image quality and resolution.

Other objectives and advantages of the disclosure can be further understood from technical features disclosed in the disclosure.

An embodiment of the disclosure provides an optical engine module. The optical engine module includes a light source unit, a first diffusion element, a polarizing beam splitting element, a second diffusion element, and a light valve. The light source unit is configured to emit a light beam. The first diffusion element is disposed on a transmission path of the light beam. The polarizing beam splitting element is disposed on the transmission path of the light beam. The first diffusion element is disposed between the polarizing beam splitting element and the light source unit. The second diffusion element has at least one optical surface. The at least one optical surface is configured to reflect and diffuse the light beam, the light beam forms an illumination beam after passing through the second diffusion element, and the illumination beam has an optical image matching angle. The light valve is disposed on a transmission path of the illumination beam. The light valve is configured to convert the illumination beam to an image beam.

An embodiment of the disclosure provides a projection device. The projection device includes the foregoing optical engine module and a projection lens. The projection lens is disposed on a transmission path of the image beam and is configured to project the image beam out of the projection device.

Based on the above, the embodiments of the disclosure have at least one of the following advantages. In the embodiment of the disclosure, the projection device and the optical engine module enable the unit optical divergence angle of the multiple sub-beams of the light beam to expand one after another through the configuration of the first diffusion element and the second diffusion element, and may form the multiple sub-illumination beams satisfying the requirements of the optical path in the projection lens. In this way, the projection device can satisfy the requirements of the optical path in the projection lens through the illumination beam formed by the optical engine module, and has good image quality and resolution. In this way, the diffusion angle of the multiple sub-beams of the light beam facing the polarized optical surface of the first surface can be reduced while maintaining the optical image matching angle of the illumination beam. In this way, in view of the characteristics of the coating film on the polarized optical surface of the polarizing beam splitting element facing the first surface, it can be designed to be suitable for beams with a small light diffusion angle, thereby reducing product costs and maintaining the image quality.

Other objectives, features and advantages of the present invention can be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the descriptions, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top", "bottom", "front", "back" etc., is used with reference to the orientation of the figure(s) being described. The components of the present invention can be positioned in a number of different orientations. As such, the directional terminology is used for purposes of illustration and is in no way limiting. On the other hand, the drawings are only schematic and the size of the components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
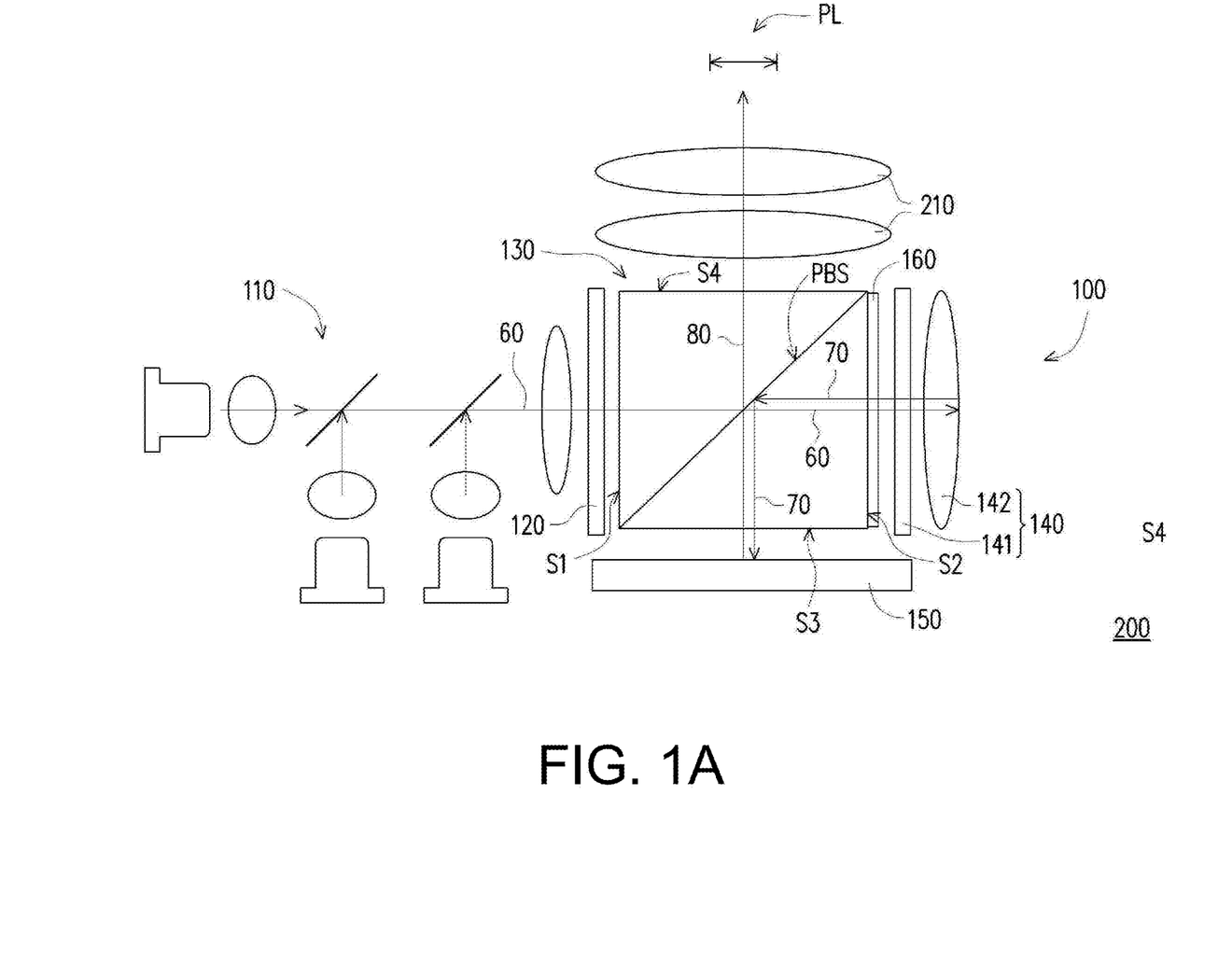
FIG. 1A is a schematic diagram of an optical architecture of a projection device according to an embodiment of the disclosure.
Figure 1B:
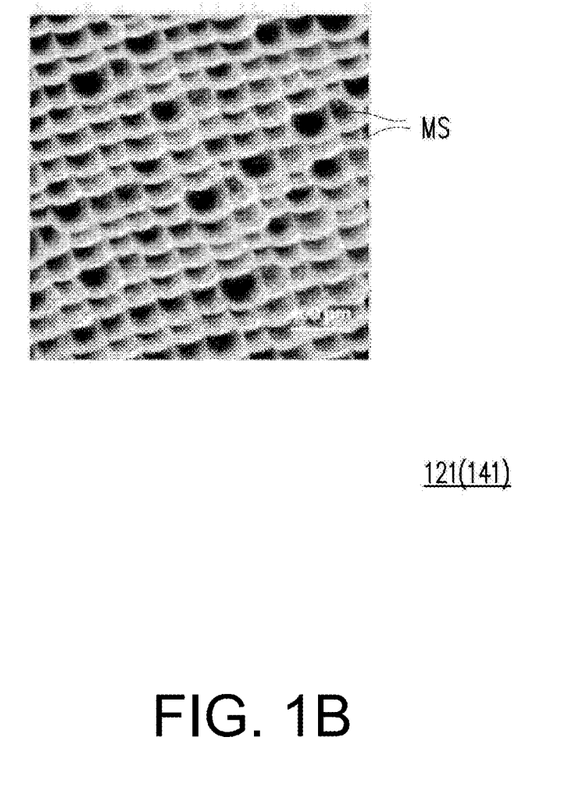
FIG. 1B is a schematic structural diagram of a microstructure in FIG. 1A.

FIG. 1A is a schematic diagram of an optical architecture of a projection device according to an embodiment of the disclosure. FIG. 1B is a schematic structural diagram of a microstructure in FIG. 1A. With reference to FIGS. 1A and 1B, in the embodiment, a projection device 200 is, for example, a near-eye display device, and is configured to be disposed in front of at least one eye of a user. Specifically, as shown in FIG. 1A, the projection device 200 includes an optical engine module 100 and projection lenses 210. Specifically, the optical engine module 100 includes a light source unit 110, a first diffusion element 120, a polarizing beam splitting element 130, a second diffusion element 140, and a light valve 150. The number of projection lenses 210 is illustrated as more than one to exemplarily indicate that multiple lenses for imaging may be included, but the disclosure is not limited thereto, and the number of the projection lenses 210 may also be one. In the embodiment, the light source unit 110 includes a laser diode (LD), configured to provide a light beam 60. That is, the light beam 60 is a laser beam. The laser light-emitting element is, for example, a blue light source, a red light source, and a green light source, but the disclosure is not limited thereto. The light source unit 110 also includes a dichroic mirror for penetrating or reflecting colored lights emitted from the blue light source, the red light source, and the green light source.

In addition, in the embodiment, the light valve 150 is, for example, a reflective light valve, which may be configured to convert an illumination beam 70 to an image beam 80.

More specifically, as shown in FIG. 1A, in the embodiment, the first diffusion element 120, the polarizing beam splitting element 130, and the second diffusion element 140 are disposed on a transmission path of the light beam 60. The first diffusion element 120 is disposed between the polarizing beam splitting element 130 and the light source unit 110, and is configured to diffuse the light beam 60. The second diffusion element 140 has at least one optical surface, and may be configured to reflect and diffuse the light beam 60. For example, the first diffusion element 120 includes a first micro lens array 121, and the second diffusion element 140 includes a second micro lens array 141 and an optical reflective mirror 142. In the embodiment, the at least one optical surface includes a surface of the second micro lens array 141 and a surface of the optical reflective mirror 142. In addition, the second micro lens array 141 of the second diffusion element 140 is disposed between the optical reflective mirror 142 and the polarizing beam splitting element 130, and a reflective surface of the optical reflective mirror 142 back faces the polarizing beam splitting element 130.

In the embodiment, the polarizing beam splitting element 130 has a first surface S1, a second surface S2, a third surface S3, a fourth surface S4, and a polarized optical surface PBS. The first surface S1 and the second surface S2 are opposite to each other, the third surface S3 and the fourth surface S4 are opposite to each other, and the third surface S3 and the fourth surface S4 are connected to the first surface S1 and the second surface S2. As shown in FIG. 1A, the light beam 60 enters the polarizing beam splitting element 130 from the first surface S1 after passing through the first diffusion element 120. After that, the light beam 60 leaves the polarizing beam splitting element 130 via the second surface S2, and is being transmitted to the second diffusion element 140. In addition, a unit optical divergence angle of a sub-beam of the light beam 60 underwent diffusion twice via the second micro lens array 141 of the second diffusion element 140. Furthermore, the light beam 60 may be reflected back to the polarizing beam splitting element 130 via the optical reflective mirror 142 of the second diffusion element 140. Moreover, the optical engine module 100 further includes a quarter wave plate 160 disposed between the second diffusion element 140 and the polarizing beam splitting element 130. Therefore, a polarization state of the sub-beam of the light beam 60 is changed when the sub-beam of the light beam 60 is reflected back to the polarizing beam splitting element 130, and it may be transmitted to the light valve 150 via reflection by the polarized optical surface PBS of the polarizing beam splitting element 130 and after passing through the third surface S3.

Next, as shown in FIG. 1A, in the embodiment, the light valve 150 is configured to transform the illumination beam 70 into an image beam 80 having multiple sub-image beams. The image beam 80 is transmitted to a pupil PL after sequentially passing through the third surface S3, the polarized optical surface PBS, and the fourth surface S4 the polarizing beam splitting element 130 and leaving the polarizing beam splitting element 130. For example, in the embodiment, the pupil PL may be an exit pupil of the projection lens 210 or a pupil of the eye of the user. The projection device 200 may be applied to virtual reality (VR) technology when the pupil PL is the pupil of the eye of the user.

In general, an overall optical shape of the illumination beam 70 has to satisfy a specific light-emitting angle range to enable the illumination beam 70 formed by the light beam 60 after leaving the optical engine module 100 to satisfy a required viewing angle range of an optical path in the projection lens 210 and to provide a divergence angle range that has to be satisfied when the sub-image beams formed by the projection lens 210 are transmitted to the pupil PL. That is, an optical image matching angle of the illumination beam 70 matches a viewing angle of the pupil PL.

Furthermore, in the embodiment, the first diffusion element 120 and the second diffusion element 140 may be configured to adjust uniformity and optical shape of multiple sub-beams of the light beam 60. An etendue of a sub beam of at least one beam 60 becomes larger and has a uniformed optical shape after the at least one beam 60 passes through the first diffusion element 120 and the second diffusion element 140. In this way, the multiple sub-beams of the at least one beam 60 may form an illumination beam 70 having the optical image matching angle via the first diffusion element 120 and the second diffusion element 140.

In the embodiment, for example, the first micro lens array 121 has multiple microstructures MS or the second micro lens array 141 has multiple microstructures MS, as shown in FIG. 1B. The microstructures MS correspond to the sub-beams, and may diffuse the unit optical divergence angle of the sub-beams to form multiple sub-illumination beams of the illumination beam 70. In the embodiment, an average width of the multiple microstructures MS is 150 micrometers (μm), but the disclosure is not limited thereto, and may be set to 100 micrometers (μm) or other values.

In addition, in addition to the micro lens array, the first diffusion element 120 and the second diffusion element 140 may also include any one of a surface scattering diffuser, a volume scattering diffuser, and a diffraction element to diffuse the unit optical divergence angle of the sub-beams of the light beam 60, so as to form the multiple sub-illumination beams of the illumination beam 70.

For example, the first diffusion element 120 and the second diffusion element 140 may also use a first diffuser and a second diffuser of the surface scattering diffuser to replace the configuration of the first micro lens array 121 and the second micro lens array 141. Surfaces of the first diffuser and the second diffuser has multiple uneven structures, and may diffuse the unit optical divergence angle of the sub-beams, and provide a same function as the microstructures MS of the first micro lens array 121 and the second micro lens array 141 shown in FIG. 1B, which are not repeated here.

In this way, the unit optical divergence angle of the multiple sub-beams of the light beam 60 may expand one after another after the multiple sub-beams of the light beam 60 pass through the first diffusion element 120 and the second diffusion element 140, and may form the multiple sub-illumination beams satisfying the requirements of the optical path in the projection lens 210. In addition, since the multiple sub-beams of beam 60 sequentially adjust the optical shape via the first diffusion element 120 and the second diffusion element 140, a diffusion angle may be adjusted in sections. The first diffusion element 120 first performs light diffusion on the multiple sub-beams of the light beam 60, and then the second diffusion element 140 performs light diffusion twice on the multiple sub-beams of the light beam 60 that are passing back and forth. In this way, the diffusion angle of the multiple sub-beams of the light beam 60 on the polarized optical surface PBS facing the first surface S1 may be reduced while maintaining the optical image matching angle of the illumination beam 70. In this way, in view of characteristics of a coating film on the polarized optical surface PBS of the polarizing beam splitting element 130 facing the first surface S1, it can be designed to be suitable for the light beam 60 with a small light diffusion angle, thereby reducing product costs, and maintaining image quality.

In this way, the illumination beam 70 formed by the at least one beam 60 via the light shape adjustment module 120 has the optical image matching angle, and the multiple sub-illumination beams configured to provide each of sub-image rays in the illumination beam 70 also have a larger field angle, which can satisfy the requirements of the optical path in the projection lens 210, and can satisfy the divergence angle range required by the pupil PL. In this way, the projection device 200 can satisfy the requirements of the optical path in the projection lens 210 through the illumination beam 70 formed by the optical engine module 100, while having good image quality and resolution.

Figure 2:
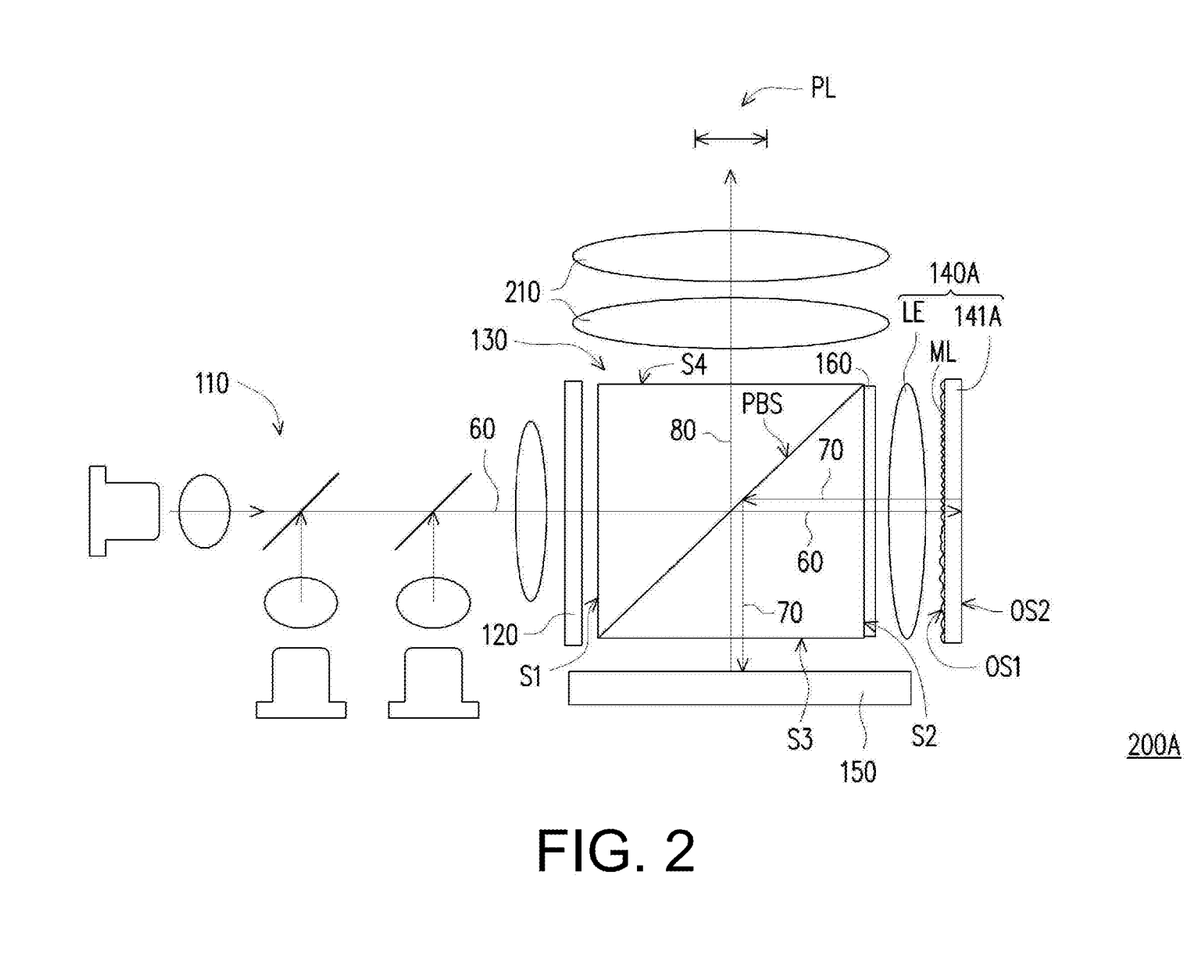
FIG. 2 is a schematic diagram of an optical architecture of another projection device according to an embodiment of the disclosure.

FIG. 2 is a schematic diagram of an optical architecture of another projection device according to an embodiment of the disclosure. With reference to FIG. 2, a projection device 200A of the embodiment in FIG. 2 is similar to the projection device 200 in FIG. 1A, and differences therebetween are as follows. In the embodiment, a second diffusion element 140A of the projection device 200A includes a microstructure optical film 141A. The microstructure optical film 141A has a first optical surface OS1 and a second optical surface OS2, and at least one optical surface of the second diffusion element 140A includes the first optical surface OS1 and the second optical surface OS2 of the microstructure optical film 141A. The first optical surface OS1 is disposed between the polarizing beam splitting element 130 and the second optical surface OS2. The first optical surface OS1 is a surface formed with multiple micro lens elements ML, and the second optical surface OS2 is a reflective surface. Moreover, in the embodiment, the second optical surface OS2 may be a flat surface. The second diffusion element 140A may also include an optical lens LE disposed between the microstructure optical film 141A and the polarizing beam splitting element 130 when the second optical surface OS2 is a flat surface. Moreover, in the embodiment, the micro lens elements ML disposed on the first optical surface OS1 may also diffuse the unit optical divergence angle of the sub-beams, and provide the same function as the microstructures MS shown in FIG. 1B, which are not repeated here. In another embodiment, the first optical surface OS1 is a surface of a micro-mirror array, and the light beam is reflected after reaching the first optical surface OS1, and in this embodiment, the second optical surface OS2 may not be disposed.

In this way, the projection device 200A may also enable the unit optical divergence angle of the multiple sub-beams of the light beam 60 to expand one after another through the configuration of the first diffusion element 120 and the second diffusion element 140A, and may form the multiple sub-illumination beams satisfying the requirements of the optical path in the projection lens 210, thereby providing similar advantages of the foregoing projection device 200, which are not repeated here.

Figure 3:
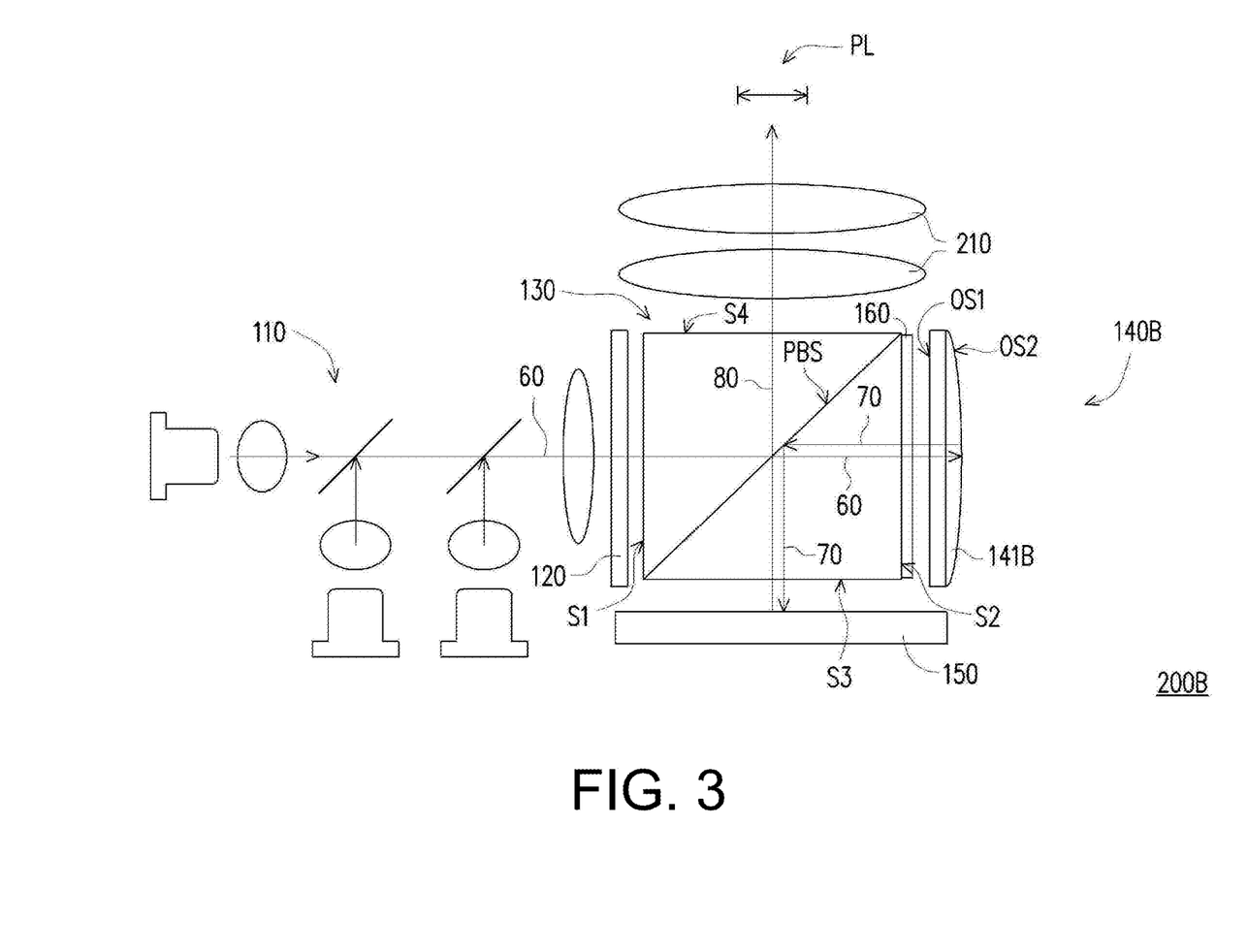
FIG. 3 is a schematic diagram of an optical architecture of another projection device according to an embodiment of the disclosure.

FIG. 3 is a schematic diagram of an optical architecture of yet another projection device according to an embodiment of the disclosure. With reference to FIG. 3, a second diffusion element 140B of the projection device 200B according to the embodiment in FIG. 3 is similar to the second diffusion element 140A of the projection device 200A in FIG. 2, and differences therebetween are as follows. The second diffusion element 140B includes a microstructure optical film 141B, and a second optical surface OS2 of the microstructure optical film 141B is a curved surface. In addition, the second diffusion element 140B has multiple microstructures, and the microstructures are configured to diffuse the light beam 60. The microstructures may be disposed on the second optical surface OS2 of the microstructure optical film 141B, or be disposed on a first optical surface OS1, and in this embodiment, the first optical surface OS1 is a flat surface. In addition, in the embodiment, the microstructures of the second diffusion element 140B may also diffuse the unit optical divergence angle of the sub-beams, and provide the same function as the microstructures MS shown in FIG. 1B, which are not repeated here.

In this way, the projection device 200B may also enable the unit optical divergence angle of the multiple sub-beams of the light beam 60 to expand one after another through the configuration of the first diffusion element 120 and the second diffusion element 140B, and may form the multiple sub-illumination beams satisfying the requirements of the optical path in the projection lens 210, thereby providing similar advantages of the foregoing projection device 200A, which are not repeated here.

In summary, the embodiments of the disclosure have at least one of the following advantages. In the embodiment of the disclosure, the projection device and the optical engine module enable the unit optical divergence angle of the multiple sub-beams of the light beam to expand one after another through the configuration of the first diffusion element and the second diffusion element, and may form the multiple sub-illumination beams satisfying the requirements of the optical path in the projection lens. In this way, the projection device can satisfy the requirements of the optical path in the projection lens through the illumination beam formed by the optical engine module, and has good image quality and resolution. In this way, the diffusion angle of the multiple sub-beams of the light beam facing the polarized optical surface of the first surface can be reduced while maintaining the optical image matching angle of the illumination beam. In this way, in view of the characteristics of the coating film on the polarized optical surface of the polarizing beam splitting element facing the first surface, it can be designed to be suitable for beams with a small light diffusion angle, thereby reducing product costs and maintaining the image quality.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby enabling persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the terms "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Furthermore, the terms such as "first" and "second" mentioned in this specification or the appended claims are used to name different elements or to distinguish between different embodiments or ranges, and are not intended to limit the upper or lower limit of the number of elements. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. A projection device, comprising:
an optical engine module, configured to provide an image beam, wherein the optical engine module comprises:
a light source unit, configured to emit a light beam;
a first diffusion element, disposed on a transmission path of the light beam;
a polarizing beam splitting element, disposed on the transmission path of the light beam, wherein the first diffusion element is disposed between the polarizing beam splitting element and the light source unit;
a second diffusion element, having at least one optical surface, wherein the at least one optical surface is configured to diffuse the light beam, the second diffusion element is configured to guide the light beam to form an illumination beam, and the illumination beam has an optical image matching angle; and
a light valve, disposed on the transmission path of the illumination beam, wherein the light valve is configured to convert the illumination beam to an image beam; and
a projection lens, disposed on a transmission path of the image beam to project the image beam out of the projection device, wherein the projection lens has a pupil, the optical image matching angle of the illumination beam substantially matches a viewing angle of the pupil.

2. The projection device according to claim 1, wherein the first diffusion element is a first micro lens array or a first diffuser.

3. The projection device according to claim 1, wherein the second diffusion element comprises:
a second micro lens array or a second diffuser; and
an optical reflective mirror, wherein the second micro lens array or the second diffuser is disposed between the optical reflective mirror and the polarizing beam splitting element, and a reflective surface of the optical reflective mirror back faces the polarizing beam splitting element.

4. The projection device according to claim 3, wherein the second optical surface is a curved surface.

5. The projection device according to claim 3, wherein the second optical surface is a flat surface, and the second diffusion element further comprises:

an optical lens, disposed between the microstructure optical film and the polarizing beam splitting element.

6. The projection device according to claim 1, wherein the second diffusion element comprises a microstructure optical film, one of surfaces of the microstructure optical film is a curved surface, there is a plurality of microstructures on the curved surface, and the microstructures are configured to diffuse the light beam.

7. The projection device according to claim 1, wherein the second diffusion element comprises a microstructure optical film, the microstructure optical film has a first optical surface and a second optical surface, wherein the first optical surface is disposed between the polarizing beam splitting element and the second optical surface, the first optical surface is a surface formed with a plurality of micro lens elements, and the second optical surface is a reflective surface.

8. The projection device according to claim 1, wherein the second diffusion element comprises a microstructure optical film, the microstructure optical film has a first optical surface, wherein the first optical surface is a surface of a micro-mirror array.

9. The projection device according to claim 1, further comprising:

a quarter wave plate, disposed between the second diffusion element and the polarizing beam splitting element.

* * * * *